July 10, 1962 J. R. CRAIG ET AL 3,043,953
X-RAY APPARATUS
Filed April 27, 1959 7 Sheets-Sheet 1

INVENTORS
JAMES R. CRAIG
BY GEORGE W. OTTO, JR.
ATTY.

Fig. 3

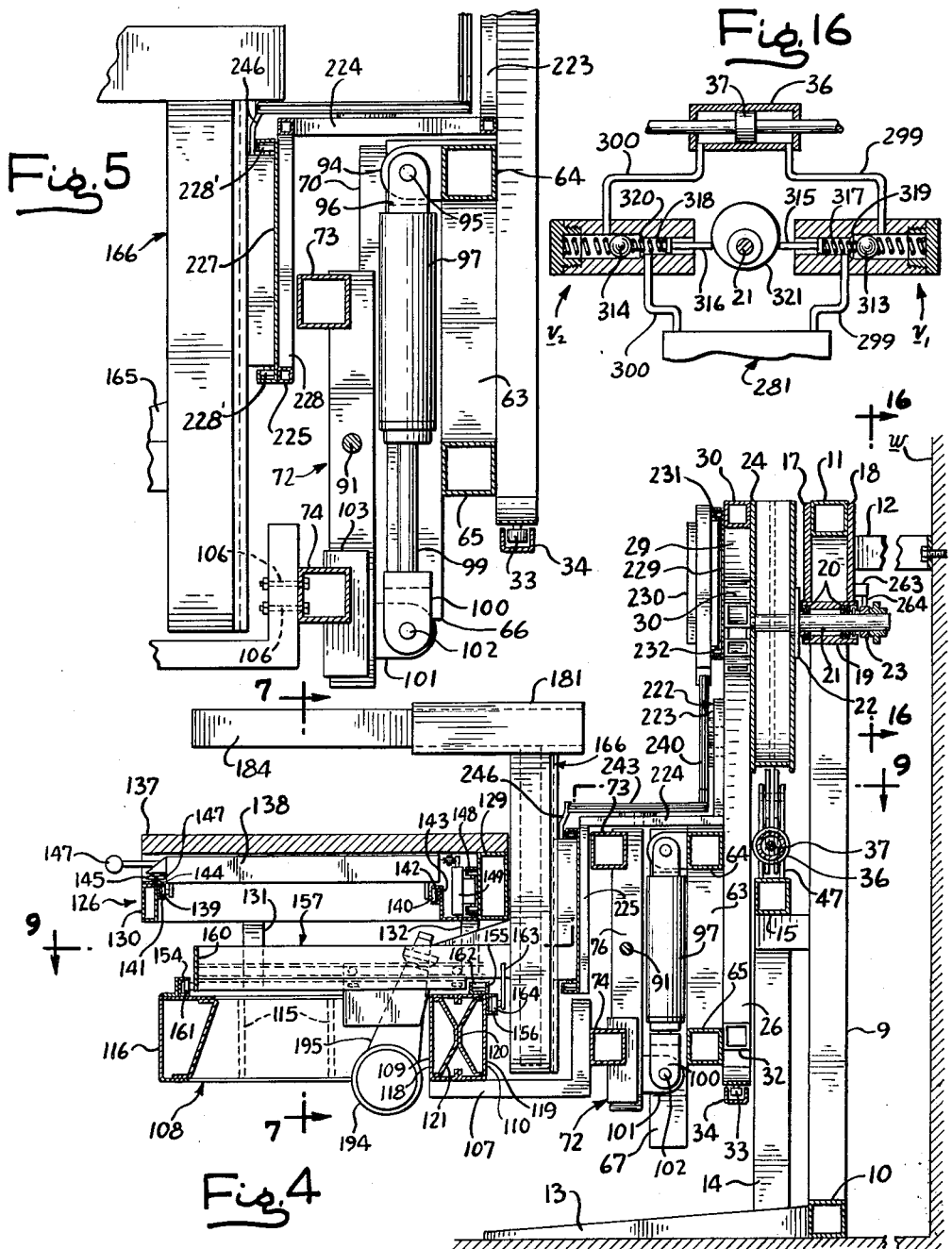

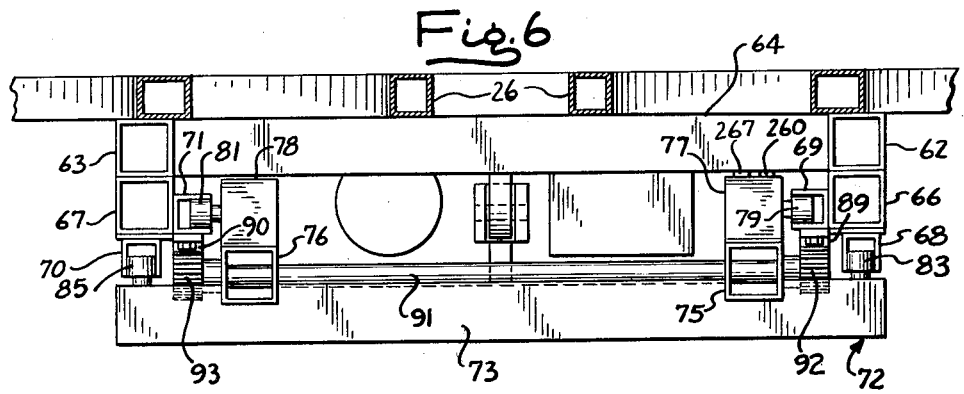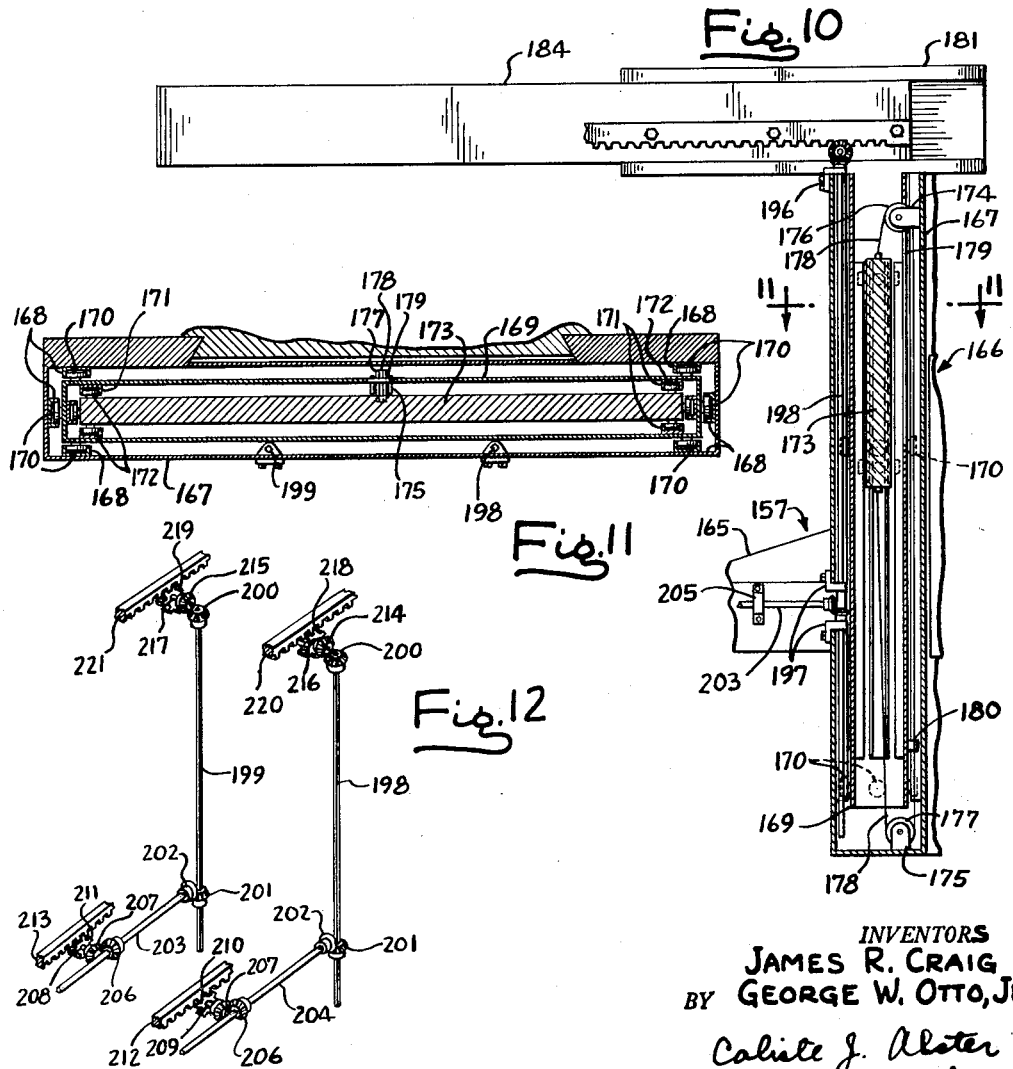

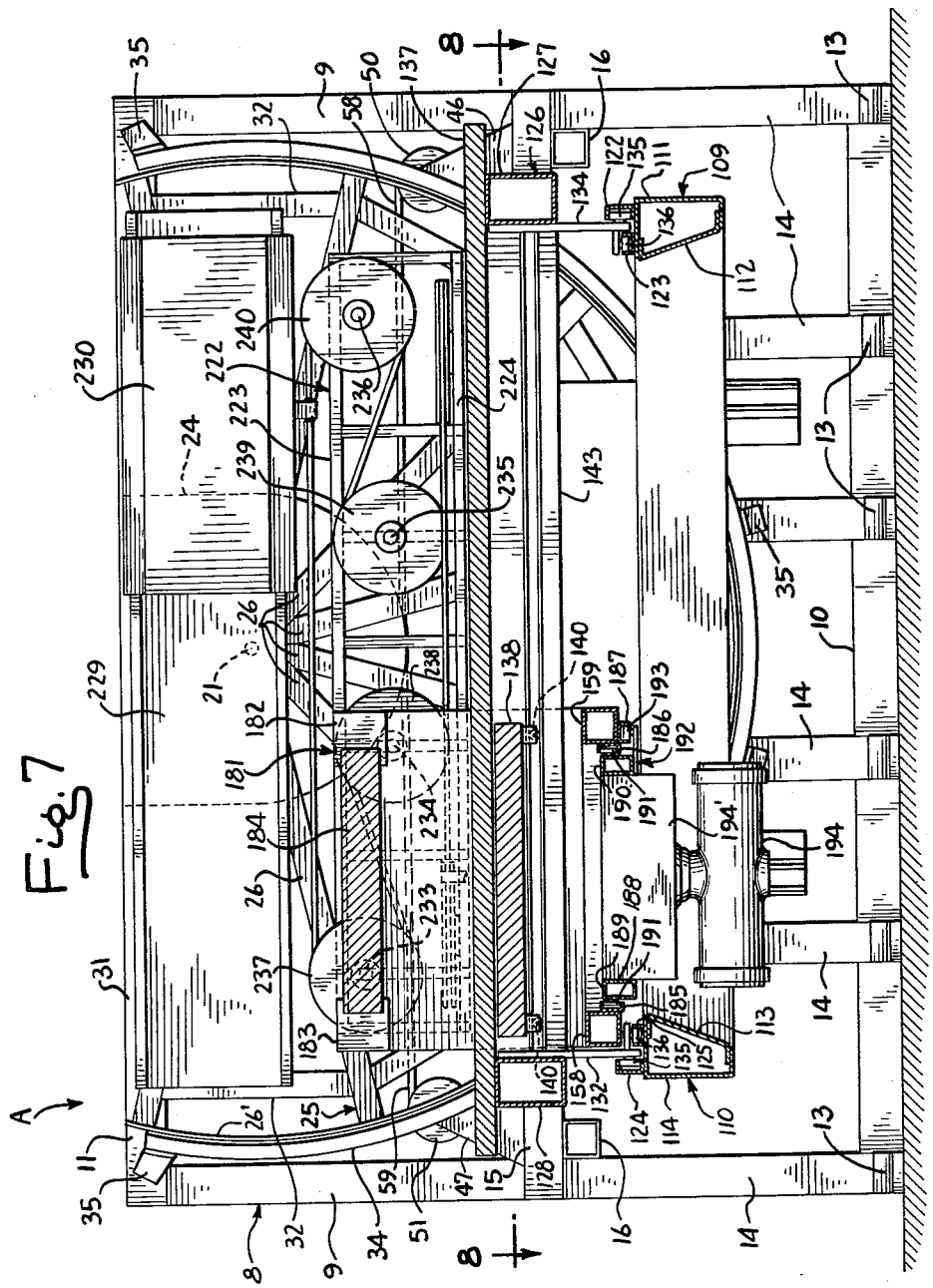

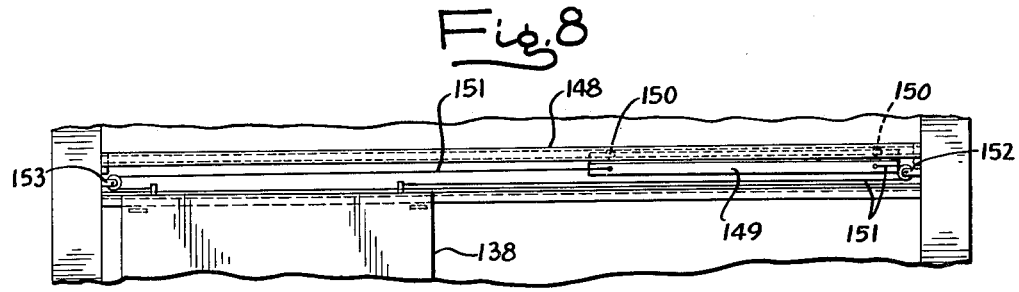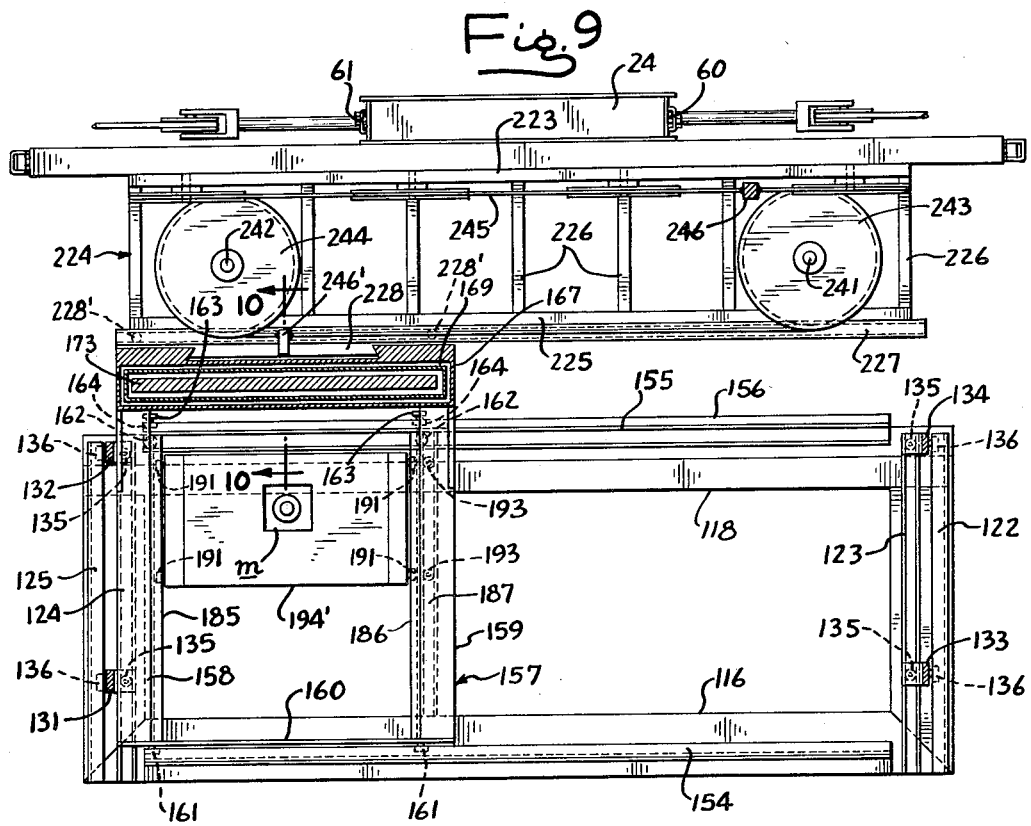

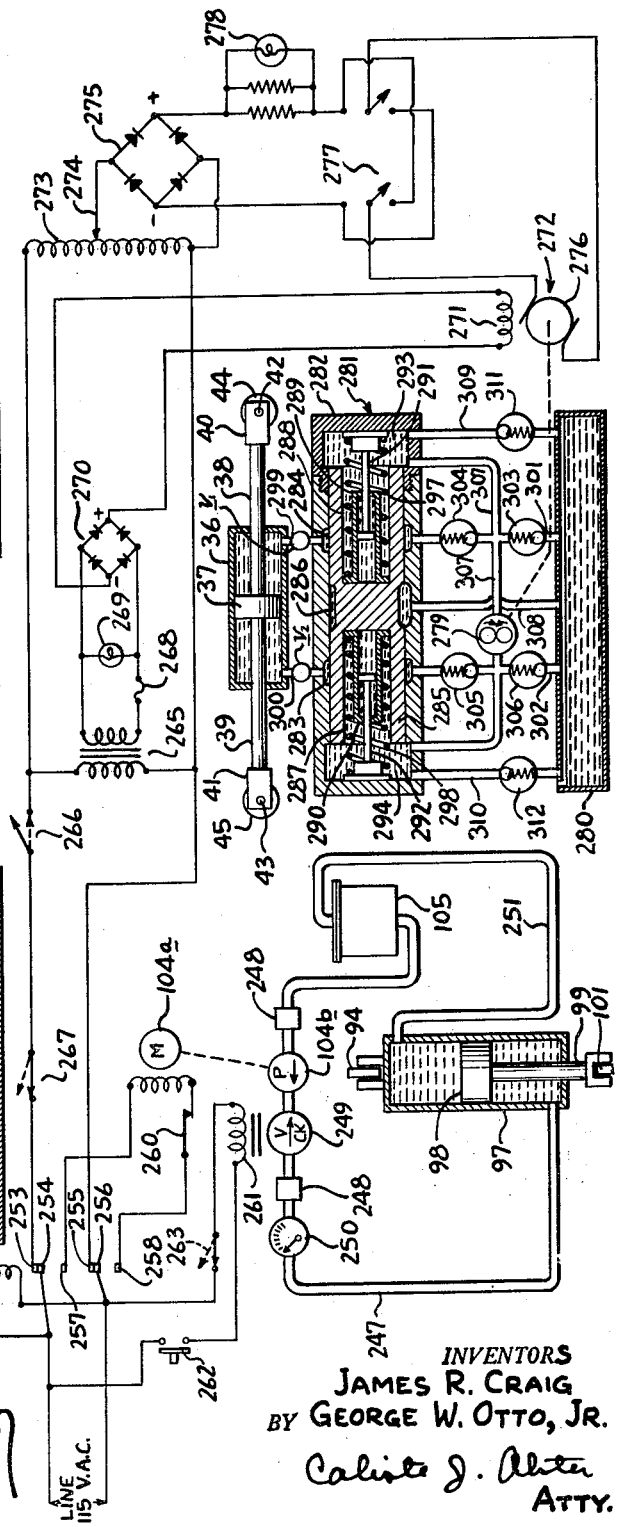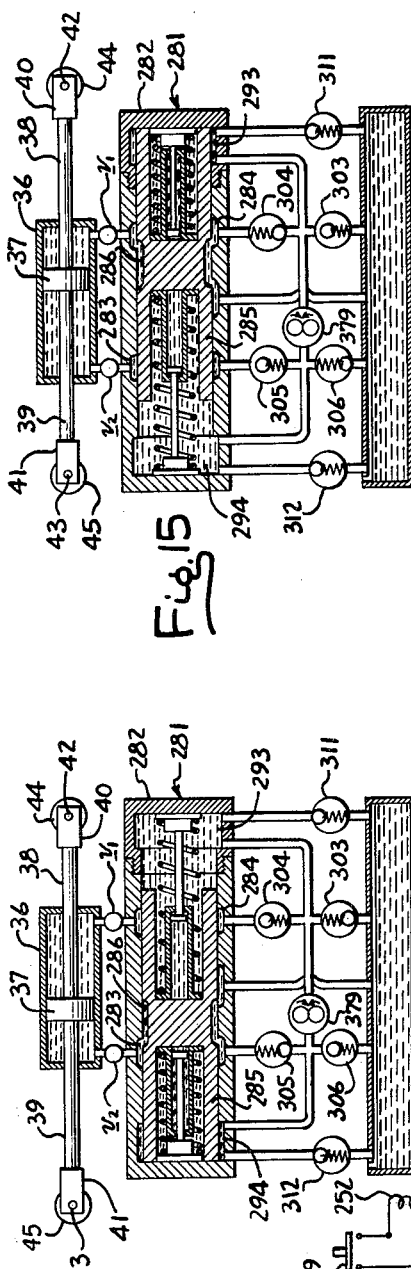

United States Patent Office 3,043,953
Patented July 10, 1962

1

3,043,953
X-RAY APPARATUS
James R. Craig, Glenview, and George W. Otto, Jr., Elmhurst, Ill., assignors to Profexray, Incorporated, Maywood, Ill., a corporation of Illinois
Filed Apr. 27, 1959, Ser. No. 808,998
11 Claims. (Cl. 250—57)

This invention relates to new and useful improvements in X-ray apparatus and, more particularly to X-ray apparatus of the type used in hospitals and the like for purposes of X-ray examination or therapy.

X-ray apparatus of the type used in hospitals for X-ray therapy and examination ordinarily includes a relatively heavy table structure upon which the patient is placed, and the table structure is usually tiltable to various angular positions so that the patient can be quickly moved to the most convenient position or positions for treatment or examination. The table structure is, furthermore, customarily provided with such accessories as an X-ray tube, a film holder below the table top, and a spot film device above the table top which also preferably includes a fluoroscopic screen. Consequently, the combined weight of the table structure and accessories is quite high and considerable driving torque is required for tilting them. Most tables are, however, equipped with tilting mechanisms which swing the table at several preselected speeds, but in certain instances it is desirable to increase progressively the speed of tilt during movement of the table. In tilting mechanism of this type the successive changes from one speed to another are often in abrupt step-like increments rather than being continuously variable and such intermittent table movement is often uncomfortable for many patients.

A further and perhaps more important problem in connection with X-ray tables resides in the fact that since sufficient floor clearance space must be provided for the ends of the relatively long table as it swings to high angles of inclination, the lowermost or horizontal position of the table top is usually of such height above the floor that it is often difficult for disabled or feeble patients to climb onto the table even with the use of a step-stool. In many instances hospital attendants are required to assist a patient onto the table who might otherwise be able to get on and off the table unassisted were the height of the table slightly lower. Moreover, when the patient is undergoing fluoroscopic examination, the table is usually horizontal and the radiologist or other examining physician must look downwardly onto the fluoroscopic screen which overlies the patient. The fluoroscopic screen is, of course, vertically adjustable between limits in the spot device tower but the range of such adjustment above the floor level is fixed and is dependent upon the height of the table top. Consequently, the screen is often somewhat higher than is desirable, and physicians of average or less than average height sometimes find it difficult to stand comfortably on the floor adjacent the table and screen the patient.

It is, therefore, a primary object of the present invention to provide an X-ray apparatus in which the table-top can be quickly and easily lowered and thereby permit many ambulatory patients to climb onto and off of the table unassisted.

It is also an object of the present invention to provide an X-ray apparatus of the type stated in which the table and fluoroscopic screen overlying the table top can be quickly lowered or elevated in unison to any selected position between the maximum and minimum height of the table so as to position the screen at elevations above the floor most convenient to the physician who is screening the patient.

It is another and more specific object of the present

2 invention to provide an X-ray apparatus of the type stated in which the table and carriage therefor are mounted for vertical sliding movement along a frame which, in turn, is rotatable about a horizontal axis so that the table can be lowered to receive the patient and thereafter elevated and tilted in either direction to any desired angular position.

It is a further object of the present invention to provide an X-ray apparatus in which the vertically slidable table and rotatable frame are operated by separate hydraulic drive mechanisms, the frame-driving mechanism being rendered inoperable unless the table is in its uppermost horizontal position and the table-driving mechanism being inoperable unless the table is horizontal.

It is another important object of the present invention to provide an X-ray apparatus of the type stated in which the angular velocity of table tilt can be changed in very small increments which are sufficiently imperceptable to the patient, thereby eliminating a source of discomfort to the patient on the table.

The attainment of the above and further objects of the present invention will be apparent from the following specifications taken in conjunction with the accompanying drawing forming a part thereof.

In the drawing:

FIG. 3 is a fragmentary sectional view taken along lines 3—3 of FIG. 1;

FIG. 4 is a sectional view taken along lines 4—4 of FIG. 3;

FIG. 5 is a fragmentary sectional view, on an enlarged scale, of a portion of FIG. 4 and showing the table in its lowered position;

FIG. 6 is a fragmentary sectional view taken along lines 6—6 of FIG. 3;

FIG. 7 is a fragmentary sectional view taken along lines 7—7 of FIG. 4;

FIG. 8 is a fragmentary sectional view taken along lines 8—8 of FIG. 7;

FIG. 9 is a sectional view taken along lines 9—9 of FIG. 4;

FIG. 10 is a fragmentary sectional view taken along lines 10—10 of FIG. 9;

FIG. 11 is a fragmentary sectional view taken along lines 11—11 of FIG. 10;

FIG. 12 is a fragmentary perspective view showing the drive system for moving the spot film device and X-ray tube in unison transversely of the table;

FIG. 13 is a schematic illustration of the electrohydraulic circuit for operating the table and illustrating the tilting drive cylinder control valve in the neutral position;

FIG. 14 is a schematic illustration showing the table-tilting drive cylinder operated in one direction;

FIG. 15 is a schematic illustration similar to FIG. 14 and showing the table-tilting drive cylinder operated in the other direction; and FIG. 16 is a fragmentary sectional view taken approximately along line 16—16 of FIG. 4 and showing the cam-operated restriction valves which form part of the present invention, the table-tilting cylinder and control valve also being shown diagrammatically.

Figure 1:
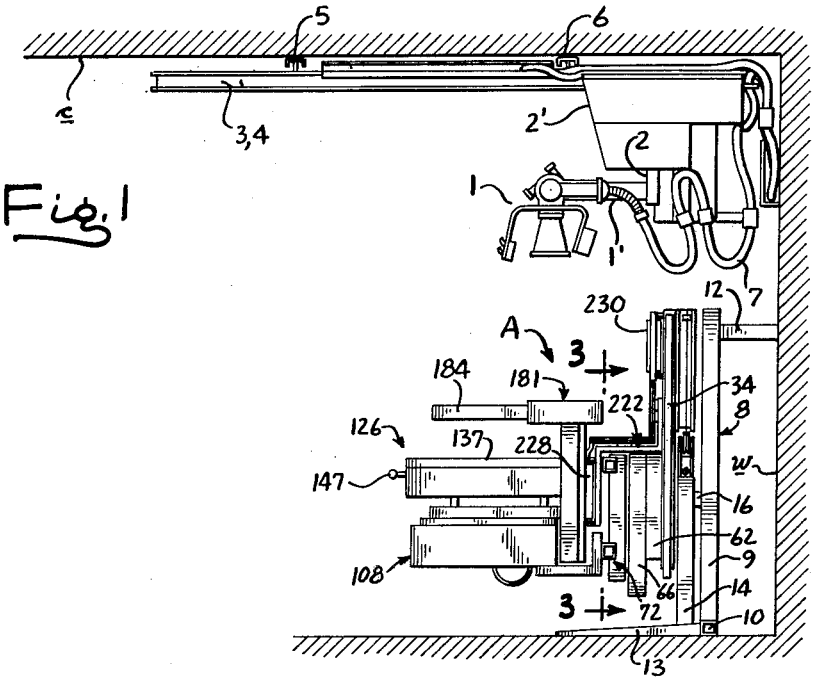
FIG. 1 is a side elevational view of an X-ray apparatus constructed in accordance with and embodying the present invention.

Referring now in more detail and by reference characters to the drawings which illustrate a practical embodiment of present invention, 1 designates an X-ray tube assembly which is pivotally mounted on an arm 1' which extends outwardly from and forms part of a vertically telescoping frame 2, the frame 2 being internally provided with counterbalancing springs and rotatably supported on an overhead carriage 2' whereby the tube 1 can be elevated or lowered to any desired height and also rotated about the vertical axis of the carriage 2'. Since the details of the internal construction and arrangement of the counterbalancing springs and carriage 2' are all well known, these features are not shown or described more fully. The upper end of the carriage 2' is mounted for sliding movement upon spaced parallel rails 3, 4 and the rails 3, 4 are, in turn, rigidly cross-connected and slidably mounted on lingitudinally extending rails 5, 6, the latter preferably being rigidly secured to the ceiling c. The X-ray tube 1 is operated through a suitable high voltage cable 7 which is connected to a conventional high voltage source (not shown). Thus, the X-ray tube 1 is capable of being shifted to a number of positions relative to an X-ray table assembly A as, for example, the dotted line postiion shown in FIG. 2.

The table assembly A comprises a supporting base 8 constructed primarily of square tubing and having a pair of spaced parallel upstanding end posts 9 which are cross connected at their lower ends by a bottom member 10, and at their upper end the posts 9 are joined by a horizontal top beam 11. Welded or otherwise rigidly secured to the top beam 11 and projecting rearwardly therefrom is a pair of spaced tie channels 12 by which the supporting base 8 can be suitably bolted to a wall w with the member 10 resting firmly upon the floor. Rigidly secured to and extending forwardly from the member 10 is a series of spaced floor-contacting foot members 13, and extending upwardly from the foot members 13 forwardly of the end posts 9 is a plurality of spaced parallel columns 14, which are smaller in height than the end posts 9. The upper ends of the columns 14 are joined by a horizontal beam 15, which is located in downwardly and forwardly spaced parallel relation to the top beam 11. Preferably the beam 15 is rigidly connected adjacent its opposite ends to the end posts 9 by short reinforcing elements 16.

Welded to and depending from the top beam 11 somewhat centrally of the ends thereof are hangers 17, 18 which support a bearing housing 19 which is suitably bored for receiving bearings 20. Rotatably mounted on the bearings 20 is a pivot shaft 21 which is provided adjacent the bearing housing 19 with collars 22, 23, and rigidly mounted on the forward end of the shaft 21 is a large U-shaped sheet metal drum 24 which forms part of a rotatable frame 25. Welded or otherwise rigidly secured to the forward face of the drum 24 and radiating outwardly from the shaft 21 is a series of spokes 26, also preferably formed of square tubing, and the outer ends of the spokes 26 are joined by a heavy gauge metal band 26'. The four uppermost spokes, designated in FIG. 3 as 27, 28, 29, 30 are joined by a relatively long chord member 31 and the spokes may also be successively joined adjacent their outer ends by short reenforcing chord members 32. Rotatably mounted on the band 26' adjacent the outer ends of the several spokes 26, 27, 30 are rollers 33 which ride in a U-shaped rail 34, the latter being in the shape of a circular arc and being rigidly secured to the base 8 by means of a series of formed angle plates 35.

Bolted or otherwise mounted on the beam 15 somewhat centrally thereof is a table-tilting hydraulic cylinder 36 having a piston 37 therein, and connected to the piston 37 and extending in opposite directions therefrom is a pair of piston rods 38, 39. At their free ends the piston rods 38, 39 are each provided with a clevis 40, 41 for receiving journal pins 42, 43 the latter rotatably supporting sprockets 44, 45. A pair of blocks 46, 47 is rigidly mounted adjacent the opposite ends of the beam 15 and at their upper ends the blocks 46, 47 are provided with journal pins 48, 49 for rotatably mounting sprockets 50, 51. Mounted in the blocks 46, 47 are chain-clamping bolts 52, 53 the ends of which are threaded for receiving nuts 54, 55, and between the nuts 54, 55 and blocks 46, 47 are compression springs 56, 57 which encircle the bolts 52, 53. Connected to the bolts 52, 53 are roller chains 58, 59 which are trained around the sprockets 44, 45, 50, 51 and are also trained over the drum 24. The ends of the roller chains 58, 59 are, furthermore, secured to the upper ends of the drum 24 and on opposite sides, respectively, thereof by additional clamps 60, 61.

Rigidly secured to the frame 25 at a plurality of the chord members 32 and spokes 26 radially outwardly of the shaft 21 is a pair of spaced parallel tubular members 62, 63 which are cross-connected at their upper ends by a brace 64. Similarly, the other ends of the tubular members 62, 63 are joined by a brace 65. Welded to the outwardly presented faces of the tubular members 62, 63 and extending lengthwise therealong is a pair of tubular rail-supporting members 66, 67 having U-shaped rails 68, 69, 70, 71 which are rigidly mounted on adjacent faces thereof. Mounted on the rails 68, 69, 70, 71 is a carriage 72 which comprises upper and lower spaced parallel beams 73, 74 and adjacent the ends of the beams 73, 74 and laterally inwardly of the rails 69, 71 are square tubular members 75, 76, the latter being welded to the beams 73, 74 to provide a structurally rigid carriage 72.

Rigidly mounted on the rearwardly presented faces of the members 75, 76 are roller-supporting elements 77, 78 upon which are rotatably mounted upper and lower rollers 79, 80, 81, 82, the rollers 79, 80, 81, 82 adapted to ride within the rails 69, 71. At their opposite ends the beams 73, 74 are similarly provided with upper and lower rollers 83, 84, 85, 86 which ride within the rails 68, 70. Also rigidly mounted within the rails 68, 70 are stop blocks 87, 88 and for purposes presently more fully appearing. Bolted or otherwise rigidly secured to the rail-supporting members 66, 67 and lying forwardly of the rails 69, 71 are rack bars 89, 90 which are disposed parallel to the several rails 68, 69, 70, 71. Journalled in the members 75, 76 and extending at right angles thereto is a pinion shaft 91 having pinions 92, 93 mounted on the opposite ends thereof, said pinions 92, 93 being adapted to mesh with the rack bars 89, 90.

Welded to the brace 64 centrally thereof is an ear 94 for receiving a pivot pin 95 which also passes through a clevis 96. The clevis 96 is rigidly connected to and forms part of a table-elevating hydraulic cylinder 97 which is internally provided with a piston 98 (FIG. 13), and the piston 98 has a downwardly extending piston rod 99 the lower end of which is provided with a clevis 100 which is secured to an ear 101 by means of a pivot pin 102. The ear 101 is rigidly joined to the carriage 72 by means of a short tubular connecting member 103 which is, in turn, welded to the lower beam 74. The piston rod 99 is, therefore, located along a line which lies radially outwardly of the axis of rotation of the shaft 21 and also parallel to the rails 68, 69, 70, 71. Rigidly mounted on the frame 25 is a hydraulic motor-pump 104 consisting of a motor 109a and a pump 109b, and also on the frame 25 is a hydraulic fluid reservoir 105. The motor pump 104 and reservoir 105 are suitably connected to the cylinder 97 in the manner shown in FIG. 13 as will be presently more fully described.

Suitably secured to the lower beam 74 by means of bolts 106 is a pair of spaced parallel L-shaped members 107 which project forwardly from the carriage 72 and are rigidly connected to a rectangular table-supporting frame 108. The frame 108 is formed of heavy gauge sheet metal and includes spaced parallel side legs 109, 110 which are perpendicular to the carriage 72 and frame 25 and are each formed of two overlapping channel members 111, 112, 113, 114 which are welded together. For purposes of reinforcing the legs 109, 110 suitable gusset plates 115 may be provided at spaced intervals therein. The forward or outermost ends of the legs 109, 110 are joined by a front frame member 116 which is preferably constructed in a manner similar to the legs 109, 110. The rear ends of the legs 109, 110 are cross-connected by a rear frame member 117 which comprises two channelshaped elements 118, 119 welded together and reinforced by a plurality of pairs of gusset plates 120, 121 as best seen in FIG. 4.

Mounted on the upwardly presented faces of the legs 109, 110 and running lengthwise therealong are U-shaped channels 122, 123, 124, 125 which form trackways for slidably supporting a table 126. The table 126 comprises a rectangular frame which lies upwardly of the legs 109, 110 and is formed by spaced parallel tubular side members 127, 128 joined by back and front members 129, 130, the front member 130 being of somewhat smaller height than the members 127, 128, 129. A plurality of legs 131, 132, 133, 134 are rigidly secured to and depend from the side members 127, 128 and each leg 131, 132, 133, 134 carries a pair of rollers 135, 136 which move along the channels 122, 123, 124, 125, and thereby permit the table 126 to shift inwardly and outwardly along the legs 109, 110. The table 126 is, furthermore, provided with a top panel 137 which is supported upon the frame members 127, 128, 129.

Disposed beneath the top panel 137 is an X-ray film carrier or bucky 138 having pairs of depending rollers 139, 140 which ride along tracks 141, 142 which extend longitudinally of the table 126. As seen in FIG. 4 the track 141 is mounted on the inside face of the front member 130 while the track 142 is mounted on an angle 143 which, in turn, is secured to the back member 129. A flange plate 144 is also secured to the upper surface of the front member 130 and slidably receives, on opposite sides thereof, rollers 145, 146. The bucky 138 is also provided with a handle 147 which projects through the space between the top panel 137 and front frame member 130 and permits manipulation thereof. Furthermore, the space between the top panel 137 and frame member 130 permits an X-ray film case to be conveniently inserted in and removed from the bucky 138. Mounted on the back member 129 and extending lengthwise therealong is a channel 148 which serves as a trackway for slidably receiving a counterweight 149, the latter being provided with rollers 150 movable along the channel 148. Cables 151 are attached to the bucky 138 and counterweight 149, and are also trained around pulleys 152, 153 which are mounted on the side members 127, 128.

Mounted on the front and rear frame members 116, 117 and extending lengthwise therealong are parallel channel rails 154, 155, 156 for slidably supporting a carrier frame 157. The carrier frame 157 comprises spaced parallel arms 158, 159 joined at their forward ends by a plate 160, and rotatably mounted at the forward ends of the arms 158, 159 are rollers 161, which ride in the channel rail 154. Similarly mounted on the rear ends of the arms 158, 159 are rollers 162 which are disposed within the channel rail 155 for slidable movement therein. Also mounted on the arms 158, 159 and just rearwardly of the rollers 162 are roller hangers 163 for rotatably supporting a third group of rollers 164, the latter being movable within the channel rail 156. Rigidly connected to the carrier frame 157 by means of gusset plates 165 is an upwardly extending spot device tower 166 which is preferably disposed at right angles to the carrier frame 157 and top panel 137 just rearwardly of the latter.

As best seen by reference to FIGS. 10–12 the spot device tower 166 includes an outer rectilinear shell 167 within which is mounted a plurality of U-shaped tracks 168 and, telescopically mounted within the outer shell 167 is a rectilinear inner shell 169 provided with rollers 170 which move within the tracks 168 and thereby permit sliding movement of the inner shell 169 within the outer shell 167. Similarly, U-shaped tracks 171 are mounted within the inner shell 169 and are parallel to the tracks 168 for receiving rollers 172, the latter being mounted on a counterweight 173 which, in turn, is located within the inner shell 169. Mounted adjacent the upper and lower ends of the outer shell 167 are brackets 174, 175 for rotatably supporting pulleys 176, 177 and trained around the pulleys 176, 177 is a cable 178 which is connected at its opposite ends to the counterweight 173. The pulley 176 and its bracket 174 also project through a longitudinal clearance slot 179 formed in the inner shell 169. The cable 178 is, furthermore, secured to the inner shell 169 by means of a suitable clamp 180. Rigidly mounted on the upper end of the inner shell 169 and extending at right angles thereto is a frame 181 which includes a pair of channels 182, 183 for slidably receiving a spot film device 184. The spot film device 184 is in upwardly spaced parallel relation to the plane of the top panel 137 and preferably includes a fluorescent screen and carrier for holding X-ray sensitive film. The details of the apparatus within the spot film device 184 are conventional and well known in the art and are, therefore, not shown and described herein. However, from the foregoing description it will be apparent that the inner shell 169 can be moved upwardly and downwardly within the outer shell 167 and thereby adjust the position of the spot device 184 relative to the table top panel 137. Furthermore, the device 184 can be easily adjusted transversely of the top panel 137.

Mounted on the inwardly presented faces of the arms 158, 159 are spaced parallel opposed U-shaped tracks 185, 186 and also mounted on the lower face of the arm 159 is a track 187 which is parallel to the tracks 185, 186. The tracks 185, 186, 187 slidably support a rectangular X-ray tube-supporting frame 188 which includes spaced parallel arms 189, 190 having rollers 191 mounted thereon, the latter being slidable within the tracks 185, 186. Roller-supporting plates 192 are rigidly secured to the arm 190 and carry rollers 193 which are disposed in the track 187. Mounted on and depending from the frame 188 is a diaphragm assembly 194' having an adjustable opening $m$ and also carried by the frame 188 below the opening $m$ is an X-ray generating tube 194 having suitable high voltage cable-receptacles 195. When the tube 194 is in operation, X-rays emitted therefrom will pass through the diaphragm opening $m$ and the top panel 137 and impinge upon the screen and/or film within the device 184.

Bolted to the outer shell 167 are pairs of spaced vertically aligned brackets 196, 197 for rotatably supporting spaced parallel splined shafts 198, 199, the upper ends of shafts 198, 199 terminating within the frame 181 and being rigidly provided with bevel gears 200. The shafts 198, 199 are also axially slidable within bevel gears 201 which are similarly splined and are rotatably mounted on the brackets 197. Meshing with the bevel gears 201 are bevel gears 202 which are mounted on spaced parallel shafts 203, 204, the latter being rotatably mounted on the arms 158, 159 by means of suitable bearings 205. Bevel gears 206 are also rigidly mounted on the shafts 203, 204 and are adapted to mesh with bevel gears 207. The bevel gear shafts 208, 209 may also be suitably journalled on the arms 158, 159 and are, furthermore, provided with pinions 210, 211 which mesh with rack bars 212, 213 rigidly mounted on the X-ray tube frame 188. The bevel gears 214, 215 are mounted upon shafts 216, 217 which also have pinions 218, 219 mounted thereon, and the shafts 218, 219 are, in turn, rotatably mounted in the frame 181. Bolted or otherwise rigidly secured to the spot film device 184 are rack bars 220, 221 which mesh with the pinions 218, 219. Consequently, movement of the spot film device 184 within the frame 181 and transversely of the top panel 137 will cause the tube frame 188 and tube 144 to travel in unison therewith. Furthermore, the splined connections between the shafts 198, 199 and bevel gears 201 permit conjoint movement of the spot film device 184 and tube frame 188 irrespective of the amount of extension of the inner shell 169 and frame 149 outwardly of the outer shell 167.

Welded to the frame 25 and carried thereby is an auxiliary frame 222 comprising three rectangular sections 223, 224, 225 each preferably formed of a plurality of sheet metal tubular members 226. The section 224 projects outwardly at right angles to the section 223 and is adapted to overlie the carriage 72, and the section 225 extends downwardly from the section 224 so as to lie in closely spaced relation to the beam 73 forwardly thereof. Mounted on the forward face of the section 225 and extending parallel to the table top 137 is a channel 227 for shiftably supporting a slide 228 having rollers 228' which ride in the track-forming ends of the channel 227. As best seen by reference to FIG. 9, the back wall of the outer shell 167 is formed to provide a dovetail slide connection with the slide 228 and thereby permit the spot device tower 166 to move at right angles to the channel 227 and for reasons presently appearing. However, the carrier frame 157 and tower 166 together with the slide 228 are all movable lengthwise of the table 126.

Figure 3:
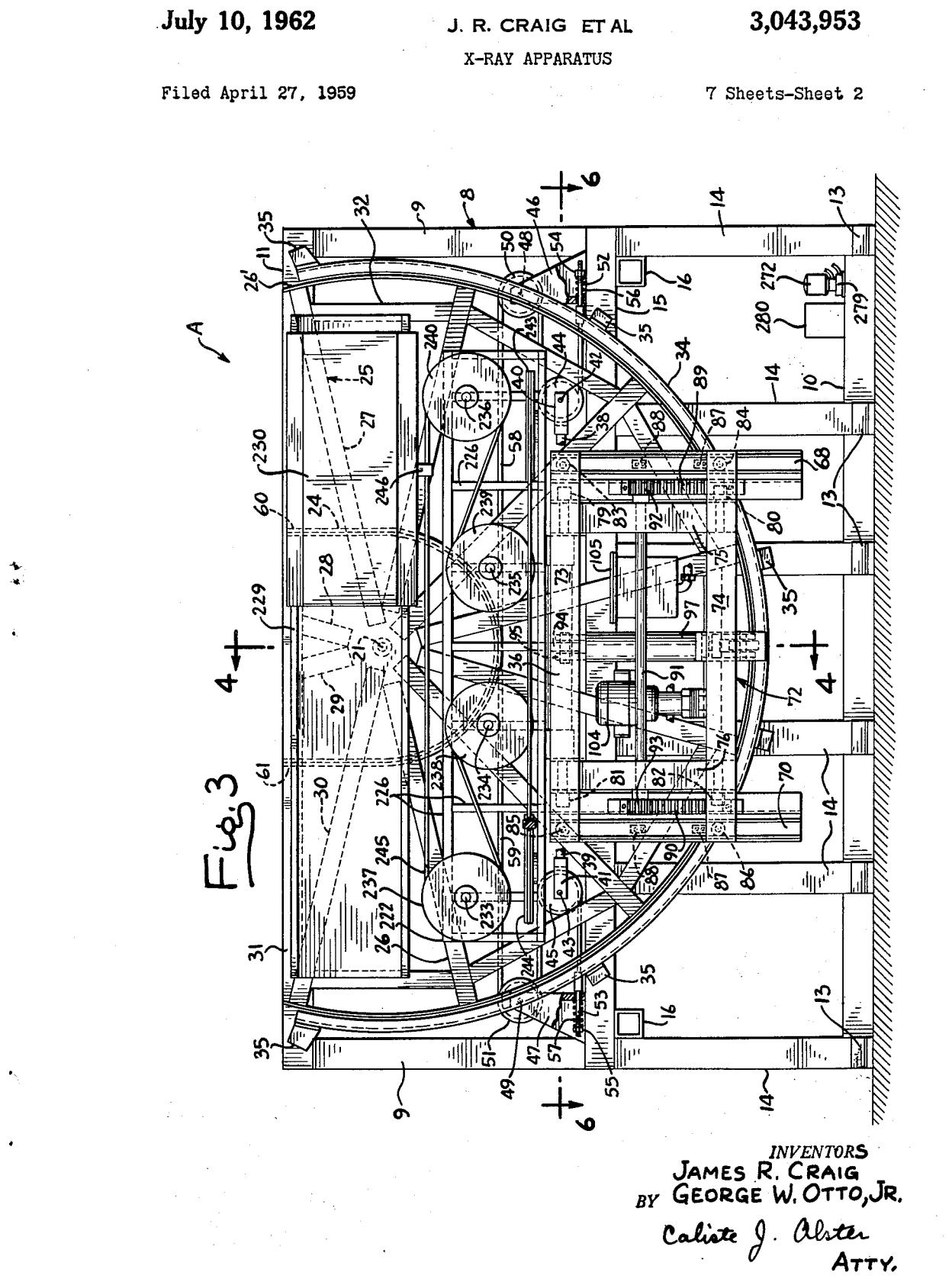

Rigidly fastened to the frame 25 adjacent the upper end thereof and extending parallel to the channel 227 is a counterweight rail 229 for slidably supporting a counterweight 230. The counterweight 230 is preferably provided with rollers 231, 232 for rotatable disposition within the rail 229. Also mounted on the frame 25 downwardly of the rail 229 are pulley shafts 233, 234, 235, 236 which journal spaced vertical pulleys 237, 238, 239, 240. The frame section 224 is also provided with pulley shafts 241, 242 for rotatably supporting pulleys 243, 244 which are at right angles to the pulleys 237, 238, 239, 240. A cable 245 is secured to the counterweight 230 by means of a clamp 246. A portion of the cable 245 is trained around the pulley 237 in one direction and then around the pulley 238 in the other direction and also around the pulley 244. Similarly, the remaining portion of the cable 245 is trained in a like manner around the pulleys 240, 239, 243 as illustrated in FIGS. 3 and 9, and finally the cable 245 is fastened to a tie member 246' which is rigidly attached to the slide 228. The counterweight 230 serves to counterbalance the carrier frame 157, tower 166 and mechanisms carried thereby.

Referring now to FIGS. 13-15 it will be seen that the reservoir 105 is connected through a conduit 247 to the lower end of the cylinder 97. Suitably interposed in the conduit 247 is the pump 104b, strainers 248, a check valve 249, and a pressure gauge 250. The upper end of the cylinder communicates with the reservoir 105 through a conduit 251. The motor 104a is connected to the line through a double pole, double throw relay having a coil 252, and contacts 253, 254, 255, 256, 257, the contacts 253, 254, 255, 256 being normally closed. Operation of the relay coil 252 is controlled by a pushbutton switch 259 so that when the latter is depressed the contacts 254, 257 and 256, 258 will close to deliver line current to the motor 104a. Included in the motor circuit is an upper limit switch 260 which is preferably mounted on the frame 25 and opened by the carriage 72 when the carriage 72 is in its fully elevated position. The check valve 249 is operated by a solenoid 261 which is also connected across the line and controlled by a pushbutton switch 262. When the solenoid 261 is energized the check valve 249 is held open. Also in the solenoid circuit is table-horizontal safety switch 263 which is closed only when the table 126 is horizontal. The safety switch 263 may, if desired, be mounted on the base 1 and operable by a small cam element 264 on the shaft collar 23 (FIG. 4).

Connected to the relay contacts 253, 255 is a power transformer 265 the primary winding circuit of which includes an on-off switch 266 and a table-raised safety switch 267, the latter being closed only when the carriage 72 and table 126 are in their uppermost position of elevation. The secondary winding circuit of the transformer 265 includes a fuse 268, a pilot lamp 269 and a rectifier bridge 270 which, in turn, is connected to the field 271 of a shunt motor 272. Also connected across the line and through the switches 266, 267 is an autotransformer 273 which is provided with a variable tap 274, the autotransformer output being connected to a rectifier bridge 275. The bridge 275 is connected to the armature 276 of the motor 272 through a reversing switch 277. If desired the armature circuit may be provided with a pilot lamp 278.

Drivingly coupled to the armature 276 is a gear pump 279 which delivers fluid from a reservoir 280, through a control valve 281 to each end of the tilt-cylinder 36. The valve 281 preferably comprises a hollow housing 282 formed with axially spaced annular passageways 283, 284, and slidable within the housing 282 is a piston 285 which is centrally undercut to provide an annular groove 286. The piston 285 is formed at its ends with coaxial bores 287, 288 for receiving tubular elements 289, 290 which are also hollowed out for slidably supporting valve rods 291, 292. The bores 287, 288 open outwardly into end portions of the housing 282 in the provision of chambers 293, 294. At their outer ends the rods 291, 292 are formed with heads 295, 296 for receiving return springs 297, 298, the springs 297, 298 also encircling the elements 289, 290 and bearing at their other ends thereagainst.

Connecting the cylinder 36 with the grooves 283, 284 are conduits 299, 300, in which restrictor valves $v_1$, $v_2$ are located, and similarly providing communications with the grooves 283, 284 and reservoir 280 are conduits 301, 302 in which check valves 303, 304, 305, 306 are interposed. The conduits 301, 302 are connected at the outlet side of the check valves 303, 306 by a pump line 307 which also provides communication between the chambers 293, 294. A return line 308 opens into the groove 286 and is connected to the reservoir 280. Also connecting the reservoir 280 and chambers 293, 294 are relief lines 309, 310 in which relief valves 311, 312 are provided. Referring to FIG. 16 it will be seen that the restrictor valves $v_1$, $v_2$ include spring biased balls 313, 314 and pushrods 315, 316 which press against springs 317, 318. The springs 317, 318 urge the balls away from the valve seats 319, 320. Mounted on the shaft 21 is a cam 321 which operates the pushrods 315, 316 and thus controls the amount of opening of the valves $v_1$, $v_2$.

In use of the apparatus, assume that the carriage 72 and table 126 are in the elevated position and also that the table 126 is horizontal, as, for instance, shown in FIG. 4. The safety switch 263 and upper limit switch 260 will each be closed, and the piston 37 and control valve will be in the position shown in FIG. 13. When it is desired to lower the table 126 the pushbutton 262 is depressed, energizing the solenoid 261 and opening the check valve 249. Fluid will then be free to flow back from the underside of the piston 98 to the reservoir 105. The carriage 72, table-supporting frame 108, table 126, carrier frame 157, and spot device tower 166 will then drop gently downwardly with the piston 98 and piston rod 99 until these elements reach their lowermost position as illustrated in FIG. 5, in which position the stops 88 will prevent further downward movement. If desired, the table 126 can be stopped at any intermediate location by merely releasing the pushbutton 262, when the table 126 is in such position. Consequently, it will be apparent that the table 126 can be lowered at right angles to the plane thereof to permit a patient to easily climb onto the top panel 137. Furthermore, since the spot device tower 166 can travel downwardly along the slide 228 and the cable 245 is anchored to the slide 228, the vertical position of the cable 245 remains unchanged as the table 126 and tower 166 are lowered. It will also be apparent that the patient may be screened and spot filmed with the table 126 at any elevation most convenient to the radiologist.

If it is desired to tilt the table 126 the table must first be elevated to its former position shown in FIG. 3. To accomplish this, the pushbutton switch 259 is depressed operating the motor pump 104 which delivers fluid from the reservoir 105 to the underside of the piston 98 and thereby lifts the carriage 72, frame 108, table 126, carrier frame 157 and tower 166 upwardly. When the carriage 72 reaches its upper limit the switch 263 automatically opens to shut off current to the motor 104a. The check valve 249 prevents return flow of fluid from the bottom of the cylinder 97 to the reservoir 105. Switch 266 will now be closed and upon closing of the switch 267 current will be supplied to the motor field 271. Assuming it is desired to rotate the frame 25 counterclockwise as viewed from FIGS. 2 and 3, the tap 274 is set for the desired speed of rotation thereof and the reversing switch 277 is closed in the appropriate direction to supply current to the armature 276. The pump 279 will then operate as shown in FIG. 14 withdrawing fluid from the reservoir 280 and delivering it to the chamber 293 and passageway 284, the latter, in turn, permitting the fluid to be delivered to the right hand side (FIG. 14) of the piston 37. The pressure in the chamber 293 will move the valve piston 285 to the right allowing fluid to return from the left hand side of the piston through the passageway 283 and groove 286 and to the reservoir all as indicated by the arrows in FIG. 14. Also the fluid pressure differential on the check valves 306, 304 will cause these valves to open. The cam 321 will rotate with the shaft 21 withdrawing the pushrod 315 from the valve $v_1$, while at the same time maintaining the valve $v_2$ opened so as to permit return flow of fluid.

Figure 2:
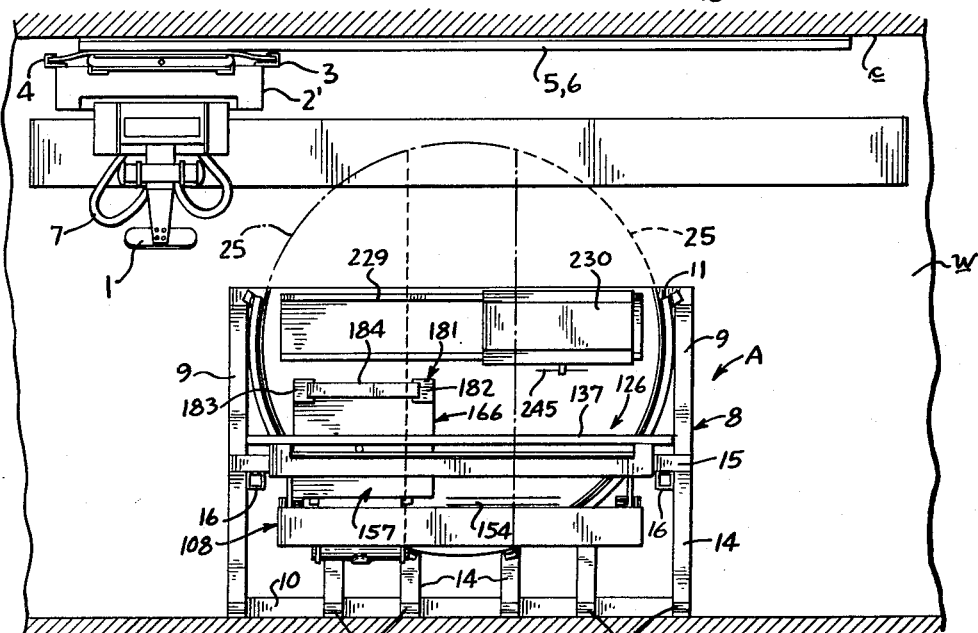
FIG. 2 is a front elevational view thereof.

As the piston 37 moves to the left the chain 58 will pull downwardly on the drum while the chain 59 will move upwardly and the frame 25, carriage 72, table 128 and mechanism carried therewith will rotate in a vertical path about the axis of the shaft 21 to the right hand dotted line position shown in FIG. 2, said position being approximately ninety degrees from the position shown in the full line position therein. The frame 25 may, of course, be stopped in any intermediate position so that the table 126 can be held at any selected angle of tilt relative to the horizontal. When the switch 277 is opened, current will no longer flow in the armature 276 and the pump 279 will stop, whereupon the valve piston 285 will return to the position shown in FIG. 13 due to presence of the return spring 298. The frame 25 and table 126 will thus be locked in their selected positions of angularity. If it is desired to change the speed of rotation of the frame 25 during movement thereof, the tap 274 is moved to vary the armature current while maintaining the field current substantially constant. The taps on the autotransformer 273 are closely spaced so that movement of the variable tap 274 will increase or decrease the speed of rotation of the frame 25 in such small increments that no abrupt speed changes apparent to the patient take place. Thus the torque-speed characteristics of the motor together with the manner in which current is supplied thereto makes it possible to provide a reasonably constant torque at each speed setting of the tap 274.

When it is desired to rotate the table 126 in the other direction or return same to the horizontal position, the reversing switch 277 is closed in its other position causing the valve piston 285 to move to the right, reference being made to FIG. 15. The pump 279 will then operate in the reverse direction to open check valves 303, 305 and deliver fluid through conduit 300 to the left hand side of the piston 37 and return fluid to the reservoir 280 through conduit 299, passageway 284, groove 286 and conduit 308, all as indicated by the arrows in FIG. 15. Thus, the piston 37 will move to the right causing the frame 25 to rotate clockwise (FIGS. 2 and 3) to the left hand dotted line position shown in FIG. 2. It should be noted, however, that as the table is lowered from the right hand dotted line position (FIG. 2) to the horizontal position, the piston 37 is power driven. The return flow of fluid will be through the valve $v_1$, the latter being held open by the pushrod 315. Furthermore, the amount of opening of the valve $v_1$ will be controlled by the cam 321 which in turn, is related to the angle at which the table is tilted. Consequently, as the table is lowered, the controlled opening of the valve $v_1$ provides a fluid path restriction and hence a load on the motor 272, the load progressively decreasing as the table is returned to the horizontal position. This feature of the invention prevents the table from overhauling as it is swung downwardly and permits smooth controlled operation of the table irrespective of the angle of tilt or the direction of movement.

In compliance with the requirements of the patent statutes we have herein shown and described a preferred embodiment of the invention. It is, however, to be understood that the invention is not limited to the precise construction herein shown, the same being merely illustrative of the principles of the invention. What is considered new and desired to be secured by Letters Patent is:

1. X-ray apparatus comprising a fixed support having bearing means and an arcuate rail radially outwardly of said bearing means, a frame provided with central horizontal shaft mounted in said bearing means, said frame also being supported at its periphery by said rail and being movable along said rail, power operated driving means mounted on said support and operatively connected to the frame for rotating the frame in two directions about the axis of the shaft, table supporting means slidably mounted on the frame, a table carried by said means outwardly of said frame and shiftable toward and away from said frame, said table having a top plane parallel to the axis of said shaft, said table being movable from a horizontal position to various tilted positions in which the top plane is at an angle to the horizontal upon rotation of said frame, driving mechanism operatively connecting the frame and the table-supporting means for moving the table-supporting means and table together along a path at right angles to said top plane, and a carrier frame slidable lengthwise of the table supporting means and adapted to carry X-ray sensitive means in overlying relation to the top of the table and an X-ray source below the table, the carrier-frame also being movable with the table when the latter is shifted at right angles to the plane of the top thereof.

2. X-ray apparatus comprising a fixed support having bearing means and an arcuate rail radially outwardly of said bearing means, a frame rotatable on said bearing, means about a horizontal axis, said frame also being supported at its periphery by said arcuate rail and being movable along said rail, a lower-operated reciprocating member mounted on said support, flexible driving means operatively connecting the opposite ends of the member to said frame radially outwardly of the bearing means so that upon operation of said reciprocating member the frame will rotate about said axis, table-supporting means mounted on said frame and rotatable therewith, and a table mounted on said means in spaced relation to the frame.

3. X-ray apparatus comprising a fixed support having bearing means, a frame rotatable on said bearing means about a horizontal axis, a power-operated reciprocating member mounted on said support, flexible driving means operatively connecting the opposite ends of the member to said frame so that upon operation of said member the frame will rotate about said axis, table-supporting means mounted on said frame and rotatable therewith, a table mounted on said means in spaced relation to the frame, said table being slidable toward and away from said frame, driving mechanism operatively interconnecting the frame and table-supporting means for shifting the latter and the table together along a path at right angles to the plane of the table, a carrier-frame slidable lengthwise of the table-supporting means and adapted to carry X-ray sensitive means in overlying relation to the table, and an X-ray source below the table and movable with the carrier frame, the carrier-frame also being slidably connected to the frame so as to be movable with the table when the latter is shifted at right angles to its plane.

4. X-ray apparatus comprising a fixed support, a frame rotatable on said support for tilting movement about a horizontal axis, driving mechanism mounted on said support for rotating the frame about the horizontal axis at a plurality of constant speeds, manually controlled means for providing substantially continuously variable adjustment of said speeds, table-supporting means mounted on said frame and rotatable therewith, a table mounted on said means in spaced relation to the frame, said table being slidable toward and away from said frame, driving mechanism operatively interconnecting the frame and table-supporting means for shifting the latter and the table together along a path at right angles to the plane of the table, a carrier-frame slidable lengthwise of the table-supporting means and adapted to carry X-ray sensitive means in overlying relation to the table, and an X-ray source below the table and movable with the carrier frame, the carrier-frame also being slidably connected to the frame so as to be movable with the table when the latter is shifted at right angles to its plane.

5. X-ray apparatus comprising a fixed base having bearing means and an arcuate rail radially outwardly of said bearing means, a frame rotatably mounted on said bearing means, said frame also being supported at its periphery by said rail and being movable along said rail, table-supporting means mounted on said frame and projecting outwardly therefrom, an X-ray table mounted on said means and being shiftable toward and away from said frame, and driving means for rotating the frame in two directions about the axis of said bearing means to move the table from a horizontal position to various tilted positions in which the table is at an angle to the horizontal.

6. X-ray apparatus having a support, an X-ray table, means mounting the table on the support, driving means for swinging the table relative to the support in either direction from a horizontal position to various tilted positions in which the table is at an angle to the horizontal with one transverse end of the table lower than the other transverse end thereof, carrier means for supporting an X-ray tube below the table, said carrier means also supporting an X-ray sensitive device overlying the top of the table for movement toward and away from the table and positioned to receive X-rays from the tube, said carrier means permitting movement of the X-ray tube and X-ray sensitive device jointly longitudinally and transversely of the table, means permitting the table to be shifted relative to the support from said horizontal position to a second horizontal position downwardly of said first mentioned horizontal position, said last-named means including driving means operable to raise the table from said second horizontal position upwardly to said first mentioned horizontal position, the shifting of the table between said two horizontal positions being without tilting of the table, and the carrier means being connected to the table so as to be movable with the table when said table is swung to the various tilted positions and when the table is shifted to and from said first mentioned and second horizontal positions, the support of the X-ray tube on the carrier means being such that the distance from said tube to the table may remain constant in each tilted and horizontal position.

7. X-ray apparatus having a support, an X-ray table, means mounting the table on the support, driving means for swinging the table relative to the support from a horizontal position to various tilted positions in which the table is at an angle to the horizontal with one transverse end of the table lower than the other transverse end thereof, an X-ray tube below the table, an X-ray sensitive device overlying the top of the table and positioned to receive X-rays from the tube, said device and X-ray tube being tiltable with the table, means for mounting the X-ray sensitive device for movement toward and away from the table and for movement jointly with the X-ray tube lengthwise of the table, means permitting the table to be shifted relative to the support from said horizontal position to a second horizontal position downwardly of said first mentioned horizontal position, said means including driving means operable to raise the table from said second horizontal position upwardly to said first mentioned horizontal position, the shifting of the table between said two horizontal positions being without tilting of the table, and the X-ray sensitive device and X-ray tube both being in operative connection with the table and movable simultaneously therewith when the table is shifted to and from the two horizontal positions.

8. X-ray apparatus having an X-ray table, an X-ray tube below the table, an X-ray sensitive device overlying the top of the table in a position to receive X-rays emitted from the tube, means forming an operative connection between the device and X-ray tube for permitting movement of the device and X-ray tube jointly longitudinally of the table, driving means for swinging the table from a horizontal position to various tilted positions in which the table is at an angle to the horizontal, means connecting the device and the X-ray tube with the table such that the X-ray tube and device move with the table when the latter is shifted to various tilted positions, and means for moving the device and the X-ray tube jointly with the table along a path at right angles to the plane of the table between two vertically spaced horizontal positions of the table so that during movement between the two horizontal positions, the distances from the X-ray tube and the device respectively to the table may be kept constant, said last-named means including control means for permitting the selective positioning of the table, tube and device at any one of a plurality of horizontal positions intermediate said upper and lower horizontal positions.

9. X-ray apparatus according to claim 8 further having a support, means mounting the table on the support and swingable with the table, and wherein the means for moving the device and X-ray tube jointly with the table along a path at right angles to the plane of the table includes a power driven member operatively interposed between the table and the means mounting the table on the support.

10. X-ray apparatus according to claim 9 wherein the power driven member is hydraulically operated.

11. X-ray apparatus according to claim 6 wherein the means mounting the table on the support includes a frame and table-supporting means, both of which are driven by the driving means that swings the table to the tilted positions, said table-supporting means projecting outwardly from said frame and supporting the table laterally of said frame, the table-supporting means being movable relative to said frame when the table is shifted to and from the two horizontal positions.

References Cited in the file of this patent

UNITED STATES PATENTS

| 1,333,349 | Stirckler | Mar. 9, 1920 |
| 2,456,277 | Heitz-Boyer | Dec. 14, 1948 |
| 2,526,879 | Kizaur | Oct. 24, 1950 |
| 2,680,046 | Stava | June 1, 1954 |
| 2,822,477 | Kizaur | Feb. 4, 1958 |
| 2,872,584 | Schiring et al. | Feb. 3, 1959 |

FOREIGN PATENTS

| 595,756 | France | July 24, 1925 |
| 889,963 | Germany | Aug. 6, 1953 |

UNITED STATES PATENT OFFICE
CERTIFICATE OF CORRECTION

Patent No. 3,043,953                              July 10, 1962

James R. Craig et al.

It is hereby certified that error appears in the above numbered patent requiring correction and that the said Letters Patent should read as corrected below.

Column 10, line 40, after "bearing" strike out the comma; line 43, for "lower" read -- power --.

Signed and sealed this 16th day of October 1962.

(SEAL)
Attest:

ERNEST W. SWIDER                                DAVID L. LADD
Attesting Officer                                    Commissioner of Patents